Dec. 31, 1963  J. J. HENRY ETAL  3,115,984
SHIP'S TANK WITH MULTIPLE COMPARTMENTS
Filed Sept. 29, 1960
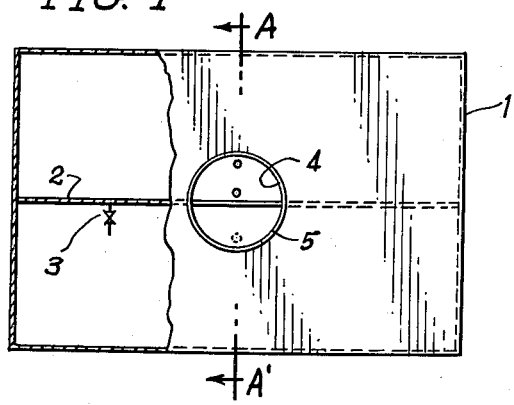
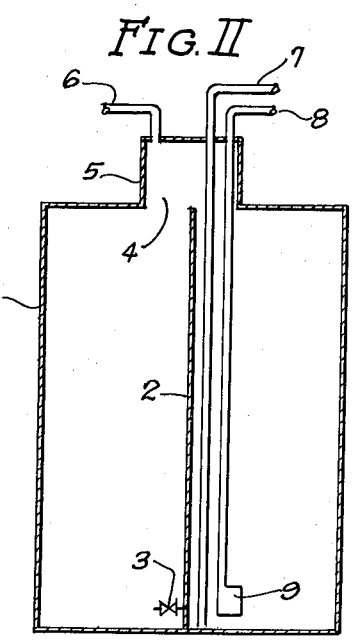
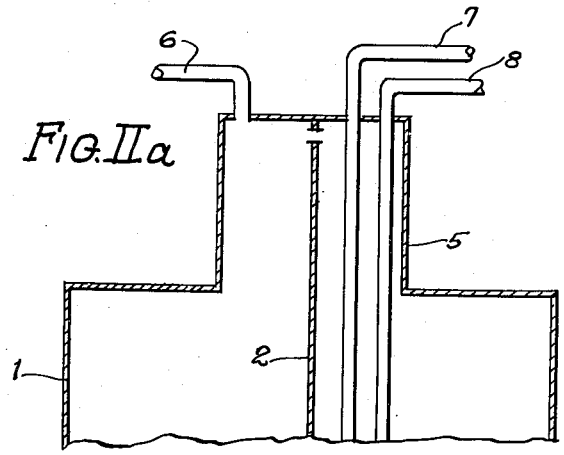
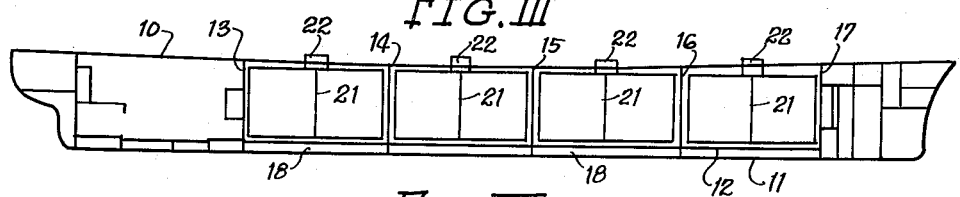
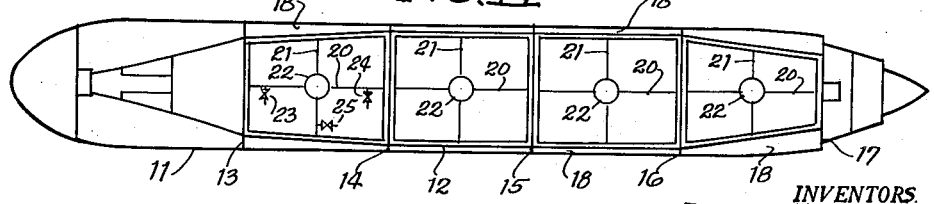
INVENTORS.
James J. Henry
BY Alfred H. Schwendtner
Ooms, McDougall, Williams & Hersh
Attorneys

3,115,984
SHIP'S TANK WITH MULTIPLE COMPARTMENTS
James J. Henry, Short Hills, N.J., and Alfred H. Schwendtner, Long Island City, N.Y., assignors to Conch International Methane Limited, Nassau, Bahamas, a corporation of the Bahamas
Filed Sept. 29, 1960, Ser. No. 59,444
7 Claims. (Cl. 220—16)

This invention relates to tankers for the transportation of liquefied gases at subatmospheric temperatures and about atmospheric pressure.

In the bulk transportation of liquefied gases at subatmospheric temperatures and about atmospheric pressure, the economics of the operation call for storage tanks in the tanker which are as large as possible, but limits are placed on the size of these tanks by the ability of the metal of which they are made to stand up to the strains and stresses caused by the rolling and pitching of the ship. Moreover, the free movement of very large volumes of liquids in a ship in response to such rolling and pitching also tends to make the ship unstable.

We have already proposed methods for dealing with this problem involving the use of clusters of large storage tanks within thermally insulated holds. However, we have now found an alternative and a more economical manner of dealing with the problem which involves the use of even larger storage tanks capable of filling an insulated hold.

Accordingly, it is an object of this invention to provide a tanker for the transportation of liquefied gases at subatmospheric temperatures and about atmospheric pressure which contains very large tanks which are so designed that the problems arising from the pitching and the rolling of the tanker are adequately dealt with.

The present invention therefore provides a tanker for the transportation of liquefied gases at subatmospheric temperatures and about atmospheric pressure, which tanker contains at least one liquid-tight hold with a large prismatic storage tank for the liquefied gas within said hold and thermal insulation between the walls of the hold and the storage tank, said storage tank being divided into a plurality of compartments by vertical internal walls within the tank reaching from the bottom to the top of the tank, at least one of the internal walls bisecting the tank longitudinally, and said storage tank having a hole in its roof communicating with each one of the compartments and with a trunk fitted on the roof of the tank through which the compartments can be filled with, and emptied of, the liquefied gas and from which the vapours boiling off from the liquefied gas can be removed.

Preferably, the storage tank is divided into four compartments by two vertical internal walls, one bisecting the tank longitudinally and the other bisecting the tank transversely, and the hole in the roof is symmetrically arranged round the point in the roof where the two internal walls cross each other.

Preferably, the tanker is divided into a number of liquid-tight holds by transverse bulkheads and a storage tank of the type described above is nested within each hold with thermal insulation between the walls of the hold and the storage tank.

Preferably, the tanker has an inner hull including an inner bottom which, together with the transverse bulkheads, form the walls of the holds. This inner hull and the transverse bulkheads may be made of a cold-resisting metal such as a high manganese steel, a nickel steel, stainless steel or aluminium, to act as a secondary barrier if the storage tanks rupture. Alternatively, it may be made of ordinary steel if a secondary barrier is unnecessary or if the thermal insulation is capable of acting as a secondary barrier.

The storage tanks themselves may be fabricated of any metal capable of withstanding the temperature of the liquid to be stored within it. Thus, if the tanker is to carry liquefied natural gas, a stainless steel or an aluminum alloy will be required, whereas, if the tanker is to carry liquid propane, a 2 to 2.5 percent nickel steel will suffice.

The thermal insulation used may be any of the known types of insulation suitable for minimising the leakage of heat into the storage tank. Material such as glass fibre, Perlite, balsa wood, paper in the form of honeycomb, cork, kapok, mineral wool, rock wool, and foamed synthetic resins such as foamed polyurethane resins, may be employed. The type or thickness of insulation used will, of course, depend on the temperature of the cargo but the thickness will usually be between 6 inches and 2 feet. If a structurally strong thermal insulating material is used, e.g., balsa wood, no special arrangements for supporting the tank are necessary. However, if a particulate or fibrous thermal insulating material is employed, then the storage tank must be supported within the hold, e.g., by wooden supports below the tank. In any case, the tanks must be anchored against displacement within the insulated hold and yet allowed to contract and expand with changing temperature, and methods for achieving this have been disclosed in United States Patent No. 2,905,352 and 2,896,416 and in the pending application Serial No. 6,701, now Patent No. 3,072,282, granted January 8, 1963.

The trunk on the roof of the storage tank which communicates through the hole in the roof with all of the compartments of the storage tank carries all the piping and apparatus necessary for filling and emptying the tank and disposing of the vapours boiling off from the liquefied gas within the tank. Any suitable arrangement of filling and emptying means may be used and each compartment may be filled and emptied separately or they may be filled and emptied through a single filling pipe and a discharge pumping arrangement. If a single filling pipe and discharge pumping arrangement is used, then it will be necessary to have ports in the dividing walls, said ports being fitted with valves which can be opened to put the compartments in communication one with the other so that, e.g., when the valves are open, a submerged pump in one compartment will empty all of the compartments. Similarly, a filling pipe going down to the bottom of one compartent will fill all compartments when the valves of the ports are open.

The trunk may be cylindrical, elliptical or prismatic in shape but is preferably cylindrical and extends through the deck of the tanker. Suitable structures for the trunk are described in pending applications Serial Nos. 716,305, now abandoned, and 699,565, now Patent No. 3,052,203. The internal vertical walls of the tank may be extended upwards through the hole in the roof of the tank into the trunk to subdivide the trunk into two or more compartments but ports must be arranged in the walls within the trunk to allow for free communication within the vapour space, or the vapour spaces of the compartments may be interconnected by suitable piping above the trunks for free communication of vapours between compartments.

Although the storage tanks in the midships sections of the tanker will normally be rectangular in horizontal cross section, the storage tanks in the forward and aft holds may be constructed with the longitudinal vertical walls converging somewhat to fit the shape of the tanker. It will also be appreciated that when, in this specification, we refer to prismatic tanks, this refers to the general shape of the tanks and there is no reason why the corner sections of the tanks should not be rounded or sloped off. The term "prismatic" in this specification is intended to be construed accordingly.

The storage tanks used in the present invention may be built with reinforcing members preferably on the inside of the walls to add the necessary strength. When designed for methane, these reinforcing members will usually be horizontal but, when the temperature conditions are not so severe, vertical reinforcement may be used.

The invention will now be described in more detail with reference to the accompanying drawings, in which FIG. I is a plan view of a storage tank used in accordance with this invention in its simplest form;

FIG. II is a side elevation view of the storage tank of FIG. I taken along the line A—A';

FIG. IIa is a side elevational view similar to that of FIG. II showing a modification in the internal wall construction;

FIG. III is a vertical sectional view of a tanker constructed in accordance with the present invention; and FIG. IV is a plan view of the tanker shown in FIG. III.

Referring to FIGS. I and II, the storage tank used in the present invention in its simplest form is a prismatic tank 1 bisected longitudinally by a vertical internal wall 2 which reaches from the floor to the roof of the tank; and preferably extends into the trunk as shown in FIG. IIa. Near the foot of the vertical wall is a valve 3 which can be operated from the deck and which will put the two compartments of the tank into communication when it is opened. Centrally placed in the roof of the tank is a hole 4 which communicates with the vapour space in both of the compartments of the tank and with the cylindrical trunk 5. The boil off vapour from both compartments of the tank exits through the trunk and the pipe 6. Passing through the trunk and reaching to the bottom of one of the compartments is a filling pipe 7 and an emptying pipe 8 fitted with deep well pump 9.

When a tank such as the one described in FIGS. I and II is placed within an insulated hold in a tanker with its longitudinal axis aligned with the length of the tanker, then, when the tanker rolls, the free surface effect of the liquid cargo on the stability of the tanker is greatly reduced. Moreover, the weight of liquid against the side wall of the storage tank is shared between the inner vertical wall 2 and one of the outer vertical walls. At the same time, because of the special arrangement of the trunk, suitable arrangements are possible for discharging and filling the tank and for taking off the boil-off without undue duplication of equipment.

Referring to FIGS. III and IV, 10 is the deck of a tanker, and 11 is the outer hull of that tanker. The tanker is fitted with an inner hull 12 divided into fluid-tight cargo spaces by means of the transverse bulkheads 13, 14, 15, 16 and 17. Inside each of these holds is built a layer of thermal insulation and a structure to support the storage tank. The layer of insulation fills the spaces 18 around each of the storage tanks in each of the holds. The storage tanks are bisected longitudinally by an internal vertical wall 20 and by an internal transverse wall 21, thus forming four compartments in each tank.

Centrally placed in the roof of each tank is a dome 22 passing through the deck of the tanker and communicating with all four compartments in each tank through the centrally placed hole in the roof of the tank to which it is affixed. The piping arrangements passing through the trunks 22 are similar to those shown in FIGS. I and II but have been omitted from FIGS. III and IV in the interests of simplicity. In the case of this tanker, valves corresponding to valve 3 in FIGS. I and II can be fitted near the base of the longitudinal wall 20, e.g., as shown at 23 and 24. In this case, two sets of filling and discharging equipment will be required. Optionally, a third valve 25 can be fitted, in which case all the compartments of the tank are in communication and only one set of charging and discharging equipment is necessary.

With the type of storage tank used in accordance with this construction, exceedingly large volumes of liquefied gases can be transported economically and safely. For example, a tanker of the type shown in FIGS. III and IV can be constructed with a capacity of about 180,000 barrels. The four storage tanks will be about 90 feet long, 72 feet wide and 44 feet high, each of them divided into four compartments as shown.

We claim:

1. A tanker for the transportation of liquefied gases at subatmospheric temperatures and about atmospheric pressure, which tanker contains at least one liquid-tight hold with a large prismatic storage tank for the liquefied gas within said hold and thermal insulation between the walls of the hold and the storage tank, said storage tank being divided into a plurality of liquid-tight compartments by vertical internal walls within the tank reaching from the bottom to the top of the tank, at least one of the internal walls bisecting the tank longitudinally, said storage tank having a trunk on its roof communicating with each of the compartments and intersected, at least in part, by said last named internal bisecting walls, each of said compartments being in communication with each other through said trunk, the trunk providing means through which the compartments can be filled with, and emptied of, the liquefied gas and from which the vapours boiling off from the liquefied gas can be removed.

2. A tanker as claimed in claim 1 in which the storage tank is divided into four compartments by two vertical internal walls, one bisecting the tank longitudinally and the other bisecting the tank transversely, and the trunk on the roof is symmetrically arranged round the point in the roof where the two internal walls cross each other.

3. A tanker for the transportation of liquefied gases at subatmospheric temperatures and about atmospheric pressure, which tanker contains a plurality of liquid-tight holds with a large prismatic storage tank for the liquefied gas within each of said holds and thermal insulation between the walls of each hold and the storage tank therein, each of said storage tanks being divided into four liquid-tight compartments by two vertical internal walls, one bisecting the tank longitudinally and the other bisecting the tank transversely, said vertical internal walls reaching from the bottom to the top of the tank and each of said storage tanks having a circular hole in the roof symmetrically arranged round the point in the roof where two internal walls cross each other, said hole communicating with each one of the compartments and with a cylindrical trunk fitted on the roof of the tank through which the compartments can be filled with, and emptied of, the liquefied gas and from which the vapours boiling off from the liquefied gas can be removed.

4. A tanker as claimed in claim 3 in which ports fitted with valves are arranged near the base of the internal walls to put the compartments in communication with each other.

5. A tanker as claimed in claim 3 in which the storage tanks are made of nickel steel.

6. A tanker as claimed in claim 1 wherein the said internal walls include portions extending upwardly into said trunk to thereby partition said trunk.

7. A tanker as claimed in claim 6 including an opening defined in said upwardly extending portions for the passage of vapors to means for removing the vapors from said trunk.

References Cited in the file of this patent

UNITED STATES PATENTS

| | | |
|---|---|---|
| 2,301,657 | Hlavaty | Nov. 10, 1942 |
| 2,318,778 | Hines | May 11, 1943 |
| 2,445,275 | Lintern et al. | July 13, 1948 |
| 2,525,251 | Willard | Oct. 10, 1950 |
| 2,584,008 | Fioretti | Jan. 29, 1952 |
| 2,703,607 | Simmonds | Mar. 8, 1955 |
| 2,764,309 | Zelonka | Sept. 25, 1956 |
| 2,896,416 | Henry | July 28, 1959 |
| 2,905,352 | Henry | Sept. 22, 1959 |
| 2,954,003 | Farrell et al. | Sept. 27, 1960 |

FOREIGN PATENTS

| | | |
|---|---|---|
| 152,233 | Australia | July 8, 1953 |